United States Patent
Chen et al.

(10) Patent No.: US 9,541,953 B2
(45) Date of Patent: Jan. 10, 2017

(54) ELECTRONIC ASSEMBLY

(71) Applicant: Acer Incorporated, New Taipei (TW)

(72) Inventors: Hsien-Wei Chen, New Taipei (TW);
Cheng-Nan Ling, New Taipei (TW);
Yi-Mu Chang, New Taipei (TW);
Chun-I Chen, New Taipei (TW);
Yu-Shih Wang, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 14/754,706

(22) Filed: Jun. 30, 2015

(65) Prior Publication Data

US 2016/0306385 A1    Oct. 20, 2016

(30) Foreign Application Priority Data

Apr. 15, 2015   (TW) .............................. 104112056 A

(51) Int. Cl.
*G06F 1/16*        (2006.01)
(52) U.S. Cl.
CPC .................. *G06F 1/1616* (2013.01)
(58) Field of Classification Search
CPC .... G06F 1/1632; G06F 1/1633; G06F 1/1646;
G06F 1/1654; G06F 1/166; G06F 1/1669;
G06F 1/1679; G06F 2200/1639
USPC .......... 361/679.17, 679.27, 679.29,
679.41,361/679.43, 679.57, 679.58, 732
See application file for complete search history.

(56) References Cited

U.S. PATENT DOCUMENTS

| | | | | |
|---|---|---|---|---|
| 6,319,015 B1* | 11/2001 | Faunce | .................. | H01R 11/22 24/662 |
| 7,540,871 B2* | 6/2009 | Gonnering | ............. | A61B 18/14 439/638 |
| 2005/0020126 A1* | 1/2005 | Shinohara | .............. | G03B 17/02 439/515 |
| 2007/0064397 A1* | 3/2007 | Chiba | ................... | G06F 1/1632 361/702 |
| 2008/0024966 A1* | 1/2008 | Huang | ................... | G06F 1/1626 361/679.06 |
| 2009/0322277 A1* | 12/2009 | Cargin, Jr. | ............ | G06F 1/1613 320/106 |
| 2011/0199319 A1* | 8/2011 | Moser | ................... | G06F 1/1654 345/173 |

(Continued)

FOREIGN PATENT DOCUMENTS

TW        200841155      10/2008
TW        M424655         3/2012

(Continued)

*Primary Examiner* — Courtney Smith
*Assistant Examiner* — Christopher L Augustin
(74) *Attorney, Agent, or Firm* — Jianq Chyun IP Office

(57) ABSTRACT

An electronic assembly including a first electronic device and a second electronic device is provided. The first electronic device has a first body and a first terminal set disposed in a recess of the first body. The second electronic device has a second body and a second terminal set disposed on the second body in a protruding manner. The first body and the second body are assembled together only by inserting and locking the second terminal set in the recess. Moreover, the first terminal set and the second terminal set are in contact with each other in the recess, such that the first and the second electronic devices are electrically connected to each other via the first terminal set and the second terminal set.

7 Claims, 4 Drawing Sheets

(56) References Cited

U.S. PATENT DOCUMENTS

| | | | | |
|---|---|---|---|---|
| 2014/0220801 A1* | 8/2014 | Shimizu | ............... | H01R 4/4863 |
| | | | | 439/131 |
| 2014/0347802 A1* | 11/2014 | Lee | ....................... | G06F 1/1626 |
| | | | | 361/679.17 |
| 2015/0070118 A1* | 3/2015 | Chang | ................... | G06F 1/1632 |
| | | | | 335/285 |

FOREIGN PATENT DOCUMENTS

| TW | M453891 | 5/2013 |
|---|---|---|
| TW | M456677 | 7/2013 |
| TW | M486242 | 9/2014 |
| TW | M488760 | 10/2014 |

\* cited by examiner

ELECTRONIC ASSEMBLY

CROSS-REFERENCE TO RELATED APPLICATION

This application claims the priority benefit of Taiwan application serial no. 104112056, filed on Apr. 15, 2015. The entirety of the above-mentioned patent application is hereby incorporated by reference herein and made a part of this specification.

BACKGROUND OF THE INVENTION

Field of the Invention

The invention relates to an electronic assembly including a first electronic device and a second electronic device that can be assembled and disassembled from each other electrically and structurally.

Description of Related Art

The biggest difference between a portable electronic device and a traditional desktop computer is that, the portable electronic device emphasizes a compact size so as to be readily carried by a user of the computer, and provides the user with the convenience of performing a computing operation in various environments. However, the portable electronic device is also limited by the compact design requirements thereof, and the function and expandability thereof also cannot be compared to those of a desktop computer having greater usage space.

Accordingly, the current portable electronic device is usually provided with a docking station so that the docking station can provide a carrying platform for the portable electronic device such that the two are combined to form an electronic assembly, and at the same time, additional usage methods and functions can also be provided to the portable electronic device. For instance, the expansion of a power supply, a keyboard input or a related human-machine control interface, a port, or a speaker . . . etc. of the portable electronic device can achieve the complete function of a current desktop computer when the portable electronic device is not in a portable state.

However, to achieve the above functions, structural and electrical connections need to be completed between the portable electronic device and the docking station at the same time. In current techniques, an external connector is usually disposed on each of the docking station and the portable electronic device, so as to achieve electrical connection between the docking station and the electronic device via the docking of the connector when the docking station and the electronic device are structurally connected. However, the exposed connector disposed on the integrated body readily causes a poor effect to the aesthetics of the electronic assembly due to the unusual visual appearance thereof.

SUMMARY OF THE INVENTION

The invention provides an electronic assembly integrating a portion of an electrically connected terminal on a combined structure of electronic devices that can be assembled and disassembled from each other.

An electronic assembly of the invention includes a first electronic device and a second electronic device. The first electronic device has a first body and a first terminal set disposed in a recess of the first body. The second electronic device has a second body and a second terminal set. The second terminal set is disposed on the second body in a protruding manner, and the second body is assembled with the first body only by inserting and locking the second terminal set in the recess. The first terminal set and the second terminal set are in contact with each other in the recess, such that the first and the second electronic devices are electrically connected to each other via the first terminal set and the second terminal set.

Based on the above, in the above embodiments of the invention, the electronic assembly includes a first electronic device and a second electronic device that can be assembled and disassembled from each other structurally and electrically, and the effect of electrical connection between the first electronic device and the second electronic device can be achieved via the first terminal set and the second terminal set when the first electronic device and the second electronic device are combined. In particular, the second terminal set is integrated on the connecting engaging structure of the second body such that the first body and the second body are structurally combined with each other by inserting and locking the second terminal set in the recess, and the above effect of electrical connection is achieved at the same time via the contact of the second terminal set and the first terminal set with each other in the recess. Accordingly, for the second electronic device, structural and electrical connections can be achieved at the same time during the combining process with the first electronic device without a connector configured for electrically connecting with the first electronic device. Moreover, the second electronic device on the second body thereof is simpler such that the effect of enhanced aesthetics can be provided.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
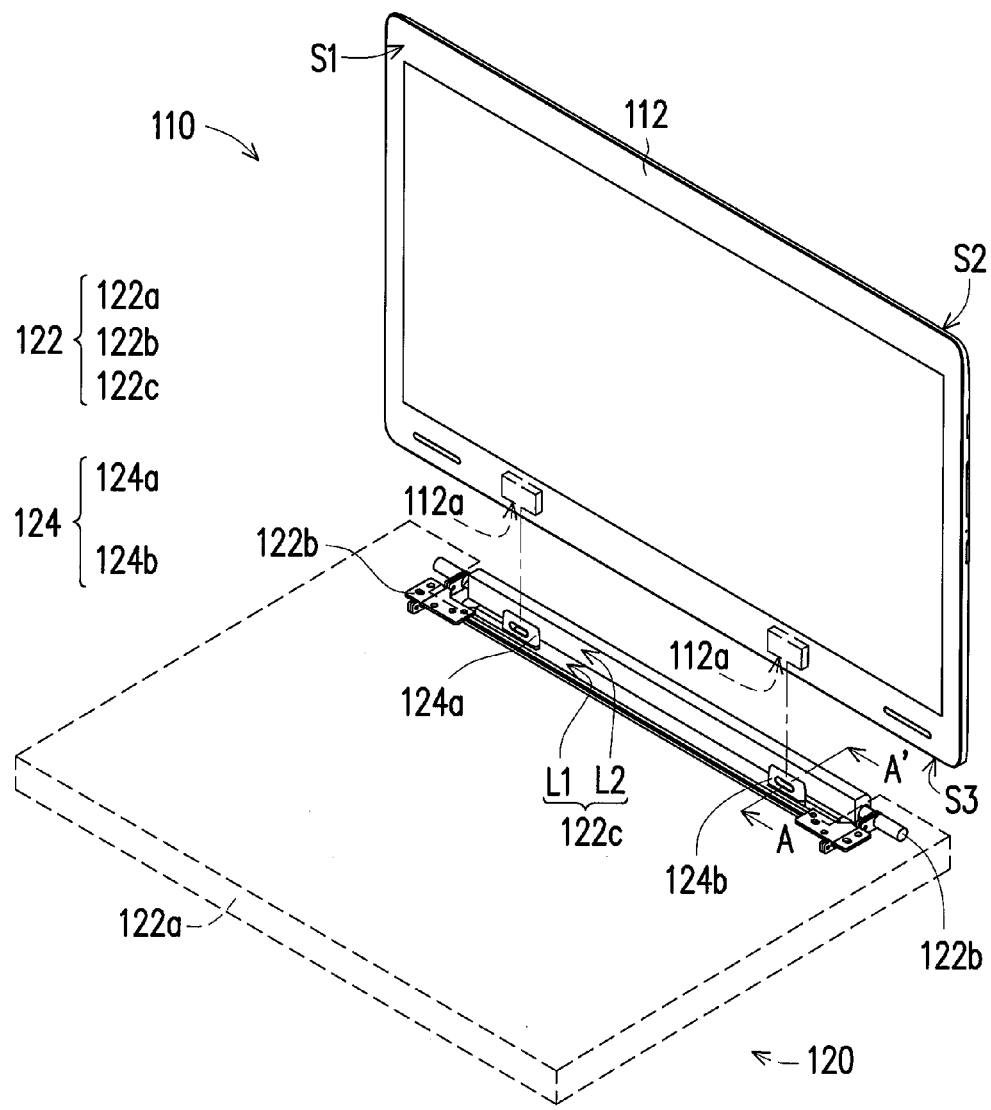
FIG. 1 is an exploded view of an electronic assembly according to an embodiment of the invention.
Figure 2:
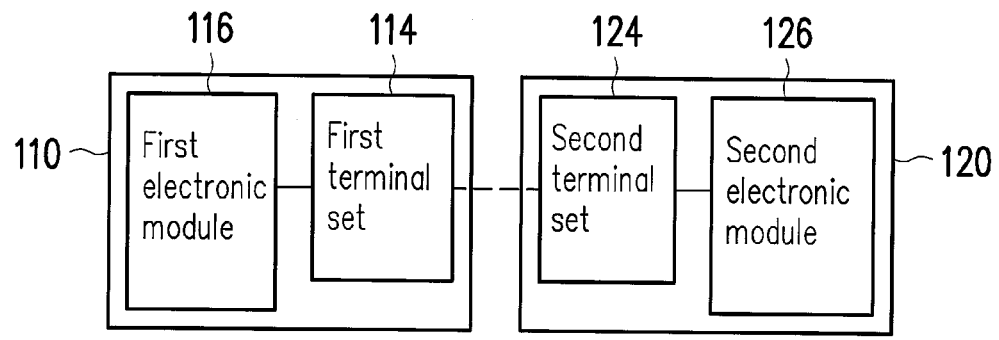
FIG. 2 is a block diagram of the electrical connection of the electronic assembly of FIG. 1.

FIG. 1 is an exploded view of an electronic assembly according to an embodiment of the invention. FIG. 2 is a block diagram of the electrical connection of the electronic assembly of FIG. 1. Referring to both FIG. 1 and FIG. 2, in the present embodiment, an electronic assembly 100 includes a first electronic device 110 and a second electronic device 120 that can be assembled and disassembled from each other, wherein the first electronic device 110 has a first body 112 and a first terminal set 114 disposed in a recess 112a of the first body 112. The second electronic device 120 has a second body 122 and a second terminal set 124, and the second terminal set 124 is disposed on the second body 122 in a protruding manner such that the second body 122 can be assembled with the first body 112 by only inserting and locking the second terminal set 124 in the recess 112a. At the same time, the first terminal set 114 and the second terminal set 124 are in contact with each other in the recess 112a, and therefore the first electronic device 110 and the second electronic device 120 are electrically connected to each other via the first terminal set 114 and the second terminal set 124.

Specifically, the first electronic device 110 of the present embodiment is, for instance, a portable electronic device including a first electronic module 116 disposed in the first body 112 and electrically connected to the first terminal set 114. The second electronic device 120 is, for instance, a docking station including a second electronic module 126 disposed in the second body 122 and electrically connected to the second terminal set 124. In the electronic module 116 or 126, the circuit driving portion of the liquid crystal display module in the first body 112 or the circuit driving portion configured to provide a power source and an input function in the second body 122 allow the first electronic device 110 or the second electronic device 120 to achieve the electronic component and circuit needed for a related function. Accordingly, the first electronic module 116 and the second electronic module 126 can achieve the effects of mutual communication and data transmission via the electrical connection of the first terminal set 114 and the second terminal set 124, such that a user assembles the first electronic device 110 on the second electronic device 120 to achieve the object of wider range of usage functions.

As described above, since the second electronic device 120 is a protruding locking structure formed by integrating the second terminal set 124 on the second body 122, a connector achieving the effect of electrical connection is not needed on the second body 122. That is, as shown in FIG. 1, other than the protruding structure of the second terminal set 124, the second body 122 has a smooth surface on the surface on which the second body 122 is combined with the first body 112. As a result, the second body 122 can retain a simple and complete outline, thus enhancing the aesthetics effect thereof.

In the present embodiment, the first body 112 has surfaces S1 and S2 opposite to each other and a side surface S3 connected between the surfaces S1 and S2, wherein the surface S1 is provided with a display surface of a display, a pair of recesses 112a are respectively located on the side surface S3, and each recess 112a is provided with a first terminal set 114 therein. Correspondingly, the second body 122 includes a body 122a, a pivot member 122c, and a pair of hinges 122b, wherein the pivot member 122c is located in the recess of the body 122a and two opposite ends thereof are connected to the body 122a via the hinges 122b, such that the pivot member 122c can be pivoted relative to the body 122a. The pivot member 122c has an L-shaped outline, and includes a bottom portion L1 and a side portion L2, wherein the second terminal set 124 includes a first terminal 124a and a second terminal 124b disposed on the bottom portion L1 in a protruding manner, and the first terminal 124a and the second terminal 124b respectively correspond to the first terminal set 114 in the pair of recesses 112a. When the first electronic device 110 is installed in the second electronic device 120, the first terminal 124a and the second terminal 124b having a protruding outline relative to the bottom portion L1 are respectively correspondingly inserted in the recesses 112a and generate structural interference with the recesses 112a, such that the first body 112 can be locked on the pivot member 122c and be borne on the bottom portion L1 and the side portion L2 at the same time.

Figure 3:
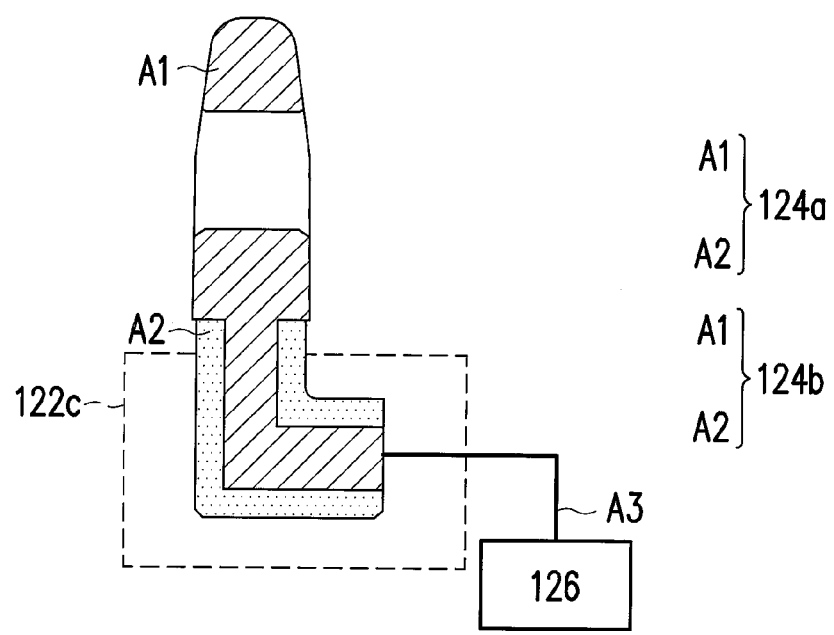
FIG. 3 illustrates a cross-sectional view of a portion of the second electronic device of FIG. 1 along A-A'.

FIG. 3 illustrates a cross-sectional view of a portion of the second electronic device of FIG. 1 along A-A'. Referring to FIG. 1 to FIG. 3 at the same time, in the present embodiment, the pivot member 122c of the second body 122 is formed by the combination of a plurality of members that are metal stamped and bended, and the second terminal set 124 and the hinges 122b can be assembled on the pivot member 122c and accordingly retain the structural strength of the pivot member 122c, so as to properly support the assembled first electronic device 110. Moreover, the first terminal 124a and the second terminal 124b of the second terminal set 124 each has a conductive portion A1 and an insulating portion A2, wherein the conductive portion A1 is assembled on the pivot member 122c of the second body 122, and the insulating portion A2 covers the outside of a portion of the conductive portion A1 and is connected between the conductive portion A1 and the pivot member 122c of the second body 122. Here, the insulating portion A2 can be formed in the peripheral edge of the conductive portion A1 through embedding injection. Moreover, the second electronic device 120 further includes an electric wire A3 electrically connected to the second electronic module 126 and between the conductive portion A1 of each of the first terminal 124a and the second terminal 124b. Therefore, after the first body 112 and the second body 122 are combined with each other via the second terminal set 124 and the recesses 112a, the first terminal set 114 can be in direct contact with the conductive portions A1 of the second terminal set 124, and be directly electrically conducted to the second electronic module 126 via the electric wire A3. Moreover, the insulating portion A2 provides the needed electrical insulation effect between the conductive portion A1 and the pivot member 122c also having a metal material, so as to effectively prevent the occurance of a short circuit.

It should also be mentioned that, in the present embodiment, the second terminal set 124 contains the first terminal 124a and the second terminal 124b, which are configured as a positive electrode terminal and a negative electrode terminal providing electric power transmission between the first electronic device 110 and the second electric device 120. Moreover, data transmission between the first electronic device 110 and the second electric device 120 is achieved via a wireless transmission module (not shown) disposed in the first body 112 and in the second body 122.

Figure 4:
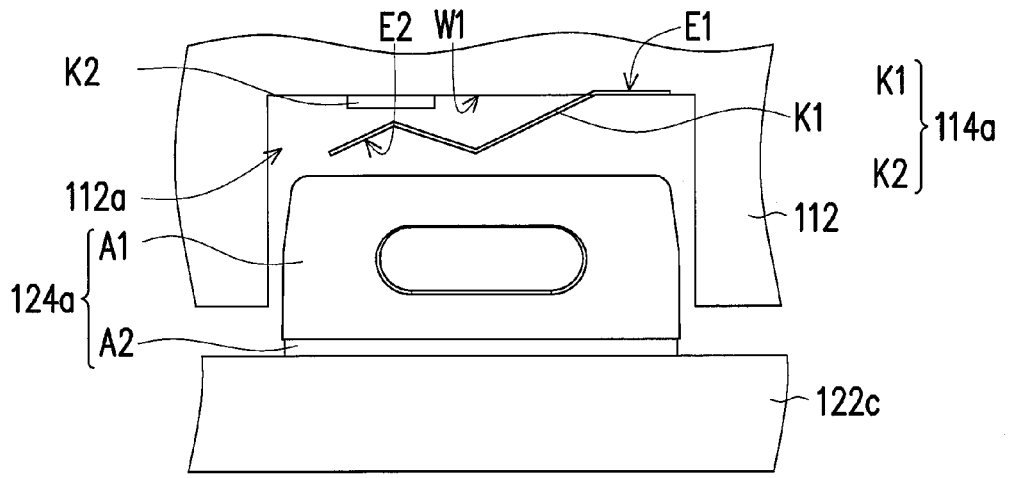
FIG. 4 to FIG. 6 respectively illustrate a schematic of a portion of the combining process of a first electronic device and a second electronic device.
Figure 5:
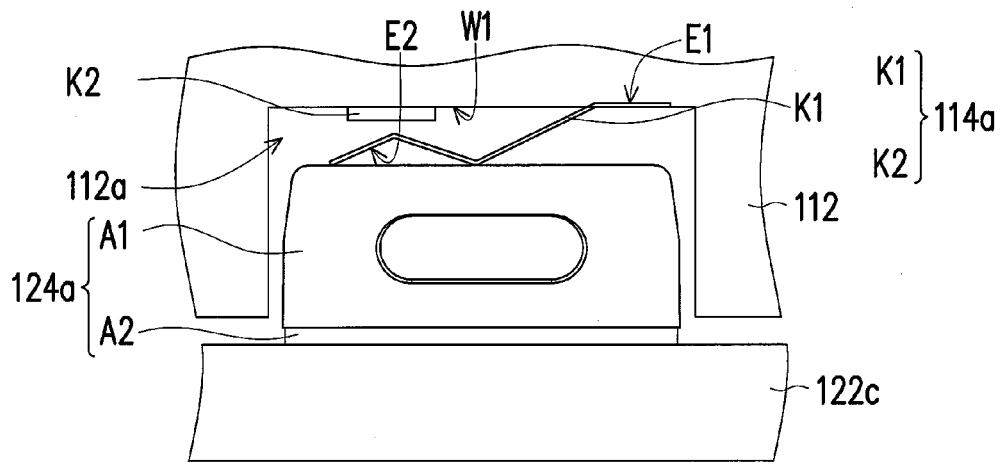
Figure 6:
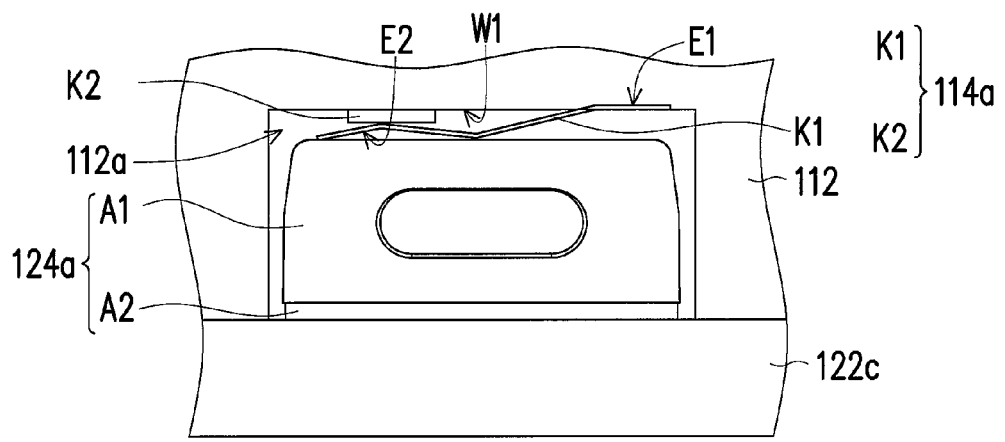

FIG. 4 to FIG. 6 respectively illustrate a schematic of a portion of the combining process of a first electronic device and a second electronic device. Referring to FIG. 4 to FIG. 6 at the same time, as described above, a pair of first terminal sets 114a and 114b are respectively disposed in a pair of recesses 112a of the first body 112 so as to be correspondingly connected to the first terminal 124a or the second terminal 124b of the second terminal set 124. Here, the first terminal set 114a is located at only one of the sides as example, and in the present embodiment, the first terminal set 114 includes a contact pad K2 and an elastic member K1, wherein the contact pad K2 is disposed on the inner wall W1 of the first body 112 and faces the opening of the recess 112a. The elastic member K1 has a first end E1 and a second end E2 opposite to each other, wherein the first end E1 is embedded in the inner wall W1, and the second end E2 is extended in the recess 112a from the first end E1 toward the direction away from the inner wall W1, and a distance is maintained between the second end E2 and the contact pad K2. That is, the second end E2 of the elastic member K1 is suspended in the recess 112a.

More specifically, the orthographic projection of the second end E2 of the elastic member K1 on the inner wall W1 is at least partially overlapped with the contact pad K2. In this way, when the first electronic device 110 and the second electronic device 120 are assembled together, that is, after the second terminal set 124 is inserted in the recess 112a, the second end E2 of the elastic member K1 is substantially located between the second set 124 and the contact pad K2. In other words, the first terminal 124a and the second terminal 124b of the second terminal set 124 are respectively in contact with the elastic member K1 of the pair of first terminal sets 114a and 114b first, and then are abutted to the contact pad K2 via the action of being continuously pushed against the elastic member K1.

Accordingly, in the present embodiment, via the above abutting order between the second terminal set 124 and the first terminal set 114, the determination of different states of the first electronic device 110 inserted in the second electronic device 120 can be further provided. Referring further to FIG. 1, in the first electronic device 110 shown, the surface S1 faces the direction of the location that the second electronic device 120 is at, and the surface S2 faces away from the direction of the location that the second electronic device 120 is at, which constitutes one of the insertion states. That is, the electronic assembly 100 is in a state similar to a notebook computer operation. In another embodiment not shown, the first electronic device 110 can also be inserted on the second electronic device 120 in a manner in which the surface S1 of the first electronic device 110 is facing away from the direction of the location that the second electronic device 120 is at, and the surface S2 faces the direction of the location that the second electronic device 120 is at. That is, the first electronic device of FIG. 1 is turned 180 degrees, which constitutes another insertion state. That is, the electronic assembly is in a state similar to a tablet operation. Accordingly, in the invention, via the following method, the state of the first electronic device 110 can be accordingly determined regardless of whether the first electronic device 110 is inserted on the second electronic device 120 forward or backward.

Figure 7:
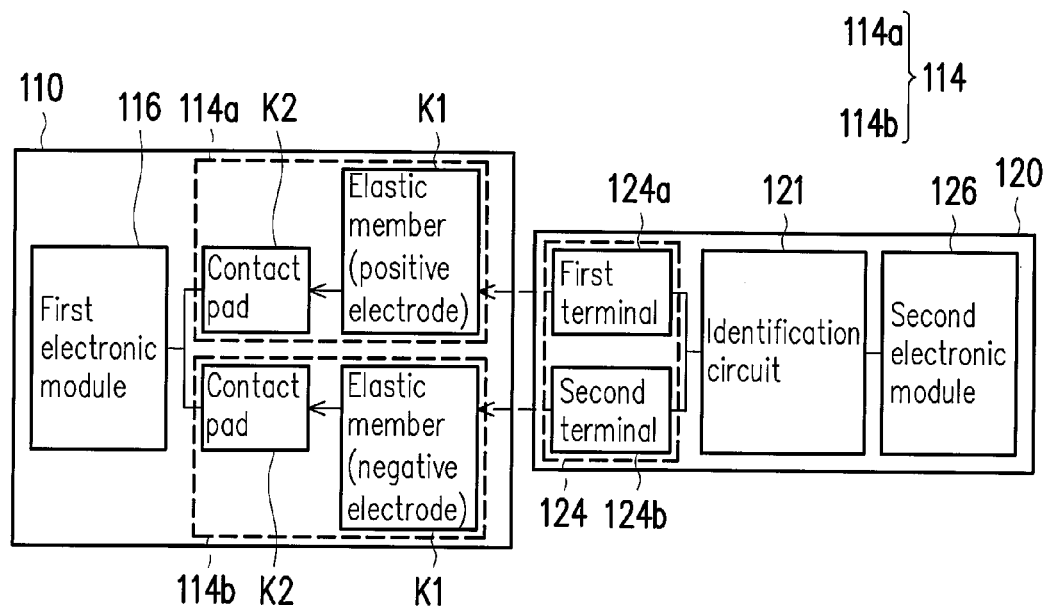
FIG. 7 illustrates a schematic of the electrical connection of a first electronic device and a second electronic device of an embodiment of the invention.

FIG. 7 illustrates a schematic of the electrical connection of a first electronic device and a second electronic device of an embodiment of the invention. Referring to FIG. 7 and previous corresponding figures, in the present embodiment, the second electronic device 120 further includes an identification circuit 121 electrically connected to the first terminal 124a and the second terminal 124b. Correspondingly, the pair of first terminal sets 114a and 114b electrically connected to the first electronic module 116 are driven by the first electronic module 116 such that one of the elastic members K1 is a positive electrode and the other one of the elastic members K1 is a negative, electrode. In this way, during the process in which the first terminal set 114 and the second terminal set 124 are abutted with each other, when the second terminal set is only in contact with the elastic member K1 but a distance is still maintained between the elastic member K1 and the contact pad K2 (as shown in FIG. 5), an electrical loop is formed between the first terminal 124a and the second terminal 124b of the second terminal set 124 and the elastic members of the pair of first terminal sets 114a and 114b. At this point, the identification circuit 121 can determine the insertion state between the first electronic device and the second electrical device according to the current direction.

For instance, as shown in FIG. 7, when the first electronic module 116 drives the elastic member K1 of the first terminal set 114a as a positive electrode and the elastic member K1 of the first terminal set 114b as a negative electrode, after the first terminal 124a and the second terminal 124b are respectively in contact with the elastic member K1, the generated current is transmitted to the (negative electrode) elastic member K1 from the (positive electrode) elastic member K1, the first terminal 124a, and the second terminal 124b in order. In contrast, when the first electronic device 110 is inserted in the second electronic device 120 in the above backward manner, since the first electronic module 116 still drives the elastic member K1 of the first terminal set 114a as a positive electrode and the elastic member K1 of the first terminal set 114b as a negative electrode, at this point, the current is transmitted to the (negative electrode) elastic member K1 from the (positive electrode) elastic member K1, the second terminal 124b, and the first terminal 124a in order. As a result, the identification circuit 121 can accordingly determine the insertion state of the first electronic device 110 on the second electronic device 120 according to the direction of the current.

Based on the above, after the determination of the insertion state of the first electronic device 110 on the second electronic device 120 is complete, the second terminal set 124 is continuously moved in the recess 112a and pressed against the elastic member K1 until the elastic member K1 is abutted on the contact pad K2 as shown in FIG. 6. At this point, the first electronic module 110 or the second electronic module 120 can provide corresponding electric power between the first electronic device 110 and the second electronic device 120 according to the state determined by the identification circuit 121. In other words, in the present embodiment, the structure of the second terminal set 124 is correspondingly designed respectively relative to the elastic member K1 and the contact pad K2, such that the insertion state between the first electronic device 110 and the second electronic device 120 can be first determined, and then the correct current transmission is provided between the two for operation.

Figure 8:
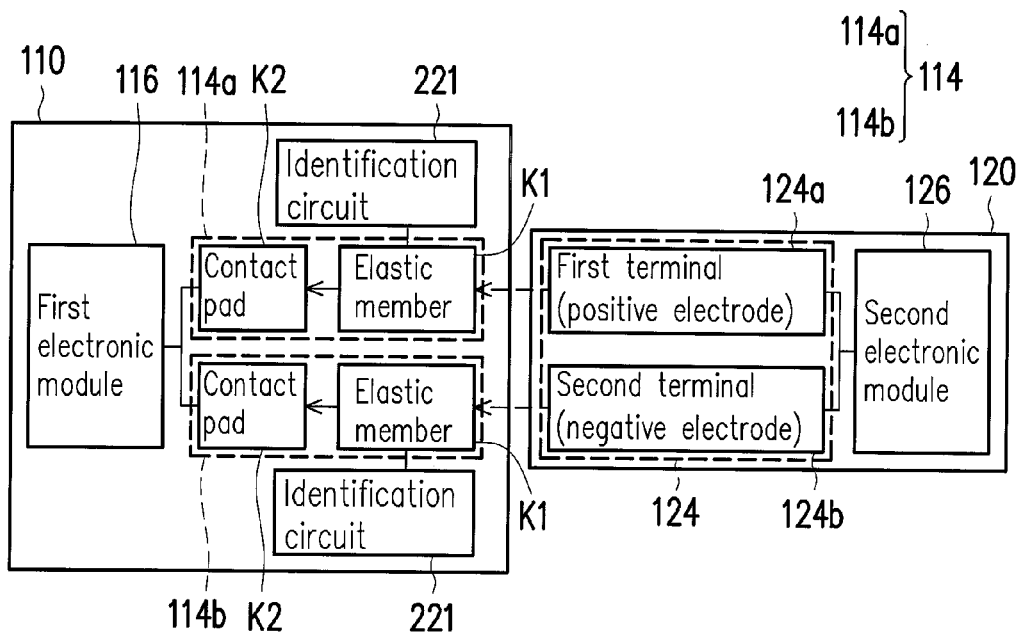
FIG. 8 illustrates a schematic of the electrical connection of a first electronic device and a second electronic device of another embodiment of the invention.

FIG. 8 illustrates a schematic of the electrical connection of a first electronic device and a second electronic device of another embodiment of the invention. The difference with the above embodiments is that, in the present embodiment, a pair of identification circuits 221 are respectively connected on the elastic members K1 of the first terminal sets 114a and 114b, and the second electronic module 120 provides electric power to the first terminal 124a and the second terminal 124b of the second terminal set 124 in a stable and continuous manner, and at the same time, drives the first terminal 124a as a positive electrode, and the second terminal 124b as a negative electrode. Accordingly, after the first terminal 124a and the second terminal 124b are respectively in contact with the elastic members K1 of the first terminal set 114, an electrical loop is formed, and as described above, the identification circuit 221 can then determine the insertion states of the first electronic device 110 and the second electronic device 120 according to the current direction in the electrical loop. Accordingly, the same determination effect as FIG. 7 can be achieved.

Based on the above, in the above embodiments of the invention, the electronic assembly includes a first electronic device and a second electronic device that can be assembled and disassembled from each other structurally and electrically, and the effect of electrical connection between the first electronic device and the second electronic device can be achieved via the first terminal set and the second terminal set when the two are combined. In particular, the second terminal set is integrated on the connecting engaging structure of the second body such that the first body and the second body are structurally combined with each other by inserting and locking the second terminal set in the recess, and the above effect of electrical connection is achieved at the same time via the contact of the second terminal set and the first terminal set with each other in the recess.

Accordingly, for the second electronic device, structural and electrical connections can be achieved at the same time during the combining process with the first electronic device without a connector configured for electrically connecting with the first electronic device. Moreover, the second electronic device on the second body thereof is simpler such that the effect of enhanced aesthetics can be provided.

Moreover, by disposing the identification circuit of the second electronic device, and at the same time providing the corresponding designs of the structures of the elastic member and the contact pad of the first terminal set, the insertion state of the first electronic device and the second electronic device can be first determined via the identification circuit during the combining process of the two, and then the current and direction thereof needed during the operation of the electronic devices is provided according to the determination result. In this way, the user does not need to worry about the situation of misplacement between the electronic devices. Moreover, possibilities that the two electronic devices are combined in different states are also increased as a result, thus increasing the scope of application of the electronic assembly.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. An electronic assembly, comprising:
   a first electronic device having a first body and a first terminal set disposed in a recess of the first body, wherein the first body has an inner wall facing an opening of the recess, the first terminal set comprising:
   a contact pad disposed on the inner wall; and
   an elastic member having a first end and a second end opposite to each other, wherein the first end is disposed on the inner wall, the second end is extended from the first end away from the inner wall, a distance is maintained between the second end and the contact pad, an orthographic projection of the second end on the inner wall is at least partially overlapped with the contact pad; and
   a second electronic device having a second body and a second terminal set, wherein the second terminal set is disposed on the second body in a protruding manner, the second body is assembled with the first body only by inserting and locking the second terminal set in the recess, and the first terminal set and the second terminal set are in contact with each other in the recess, such that the first electronic device and the second electronic device are electrically connected to each other via the first terminal set and the second terminal set,
   wherein when the second terminal set is inserted in the recess, the second end is located between the contact pad and the second terminal set,
   wherein the first electronic device comprises a pair of first terminal sets, the second terminal set comprises a first terminal and a second terminal, and the first terminal and the second terminal respectively correspond to the pair of first terminal sets.

2. The electronic assembly of claim 1, wherein other than the second terminal set, the second body has a smooth surface on a surface on which the second body and the first body are combined.

3. The electronic assembly of claim 1, wherein the first terminal and the second terminal each has:
   a conductive portion assembled to the second body; and
   an insulating portion covering an outside of a portion of the conductive portion and connected between the conductive portion and the second body.

4. The electronic assembly of claim 3, wherein the second electronic device further comprises:
   a second electronic module disposed in the second body; and
   at least one electric wire electrically connected between the second electronic module and the conductive portions.

5. The electronic assembly of claim 4, wherein the second electronic module drives one of the first terminal and the second terminal as a positive electrode and the other one as a negative electrode, the first electronic device has an identification circuit electrically connected to one of the pair of elastic members, and when the second terminal set is in contact with the pair of elastic members, the identification circuit is configured to determine a polarity of the first terminal and the second terminal.

6. The electronic assembly of claim 1, wherein the second electronic device has an identification circuit electrically connected to the first terminal and the second terminal, the first electronic device has a first electronic module electrically connected to the pair of first terminal sets and making one of the pair of elastic members as a positive electrode and the other one of the pair of elastic members as a negative electrode, and when the second terminal set is in contact with the pair of elastic members, the identification circuit is configured to determine a polarity of the pair of elastic members.

7. The electronic assembly of claim 1, wherein the first terminal and the second terminal are respectively configured to transmit a positive electrode terminal and a negative electrode terminal of an electric power.

* * * * *